United States Patent
Bennett (12)

(10) Patent No.: US 6,545,382 B1
(45) Date of Patent: Apr. 8, 2003

(54) SPINDLE MOTOR INCLUDING STATOR WITH MAGNETIC FLUX GUIDES

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/112,259

(22) Filed: Mar. 29, 2002

(51) Int. Cl.$^7$ .......................................... H02K 310/216
(52) U.S. Cl. ..................... 310/216; 310/254; 310/259
(58) Field of Search ..................... 310/67 R, 216, 310/218, 254, 259

(56) References Cited

U.S. PATENT DOCUMENTS

| 4,237,396 | A | * | 12/1980 | Blenkinsop et al. ... 310/154.06 |
| 5,365,137 | A | * | 11/1994 | Richardson et al. ........ 310/258 |
| 5,506,458 | A | * | 4/1996 | Pace et al. ................. 310/67 R |
| 6,316,853 | B1 | * | 11/2001 | MacLeod ................... 310/67 R |

OTHER PUBLICATIONS

Hartman et al., "Cogging Torque Control in Brushless DC Motors," Incremental Motion Control Systems Society, 29th Annual Symposium Proceedings, Jul. 2000, pps. 237–244.

\* cited by examiner

*Primary Examiner*—Nestor Ramirez
*Assistant Examiner*—Leda Pham
(74) *Attorney, Agent, or Firm*—W. Chris Kim, Esq.; Milad G. Shara, Esq.; Stetina Brunda Garred & Brucker

(57) ABSTRACT

An aspect of the invention can be regarded as a spindle motor. The spindle motor includes a rotor and a stator. The rotor includes a first plate defining a circular first plate periphery disposed about a central axis, a second plate defining a circular second plate periphery disposed about the central axis, and a magnet defining a circular periphery disposed about the central axis between and parallel to the first and second plates. The stator includes a plurality of magnetic flux guides distributed radially about the rotor. Each magnetic flux guide includes a U-shaped guide body, a first end extending from the guide body and terminating at a first tooth face disposed adjacent the first plate periphery, and a second end extending from the guide body opposite the first end and terminating at a second tooth face disposed adjacent the second plate periphery

21 Claims, 6 Drawing Sheets

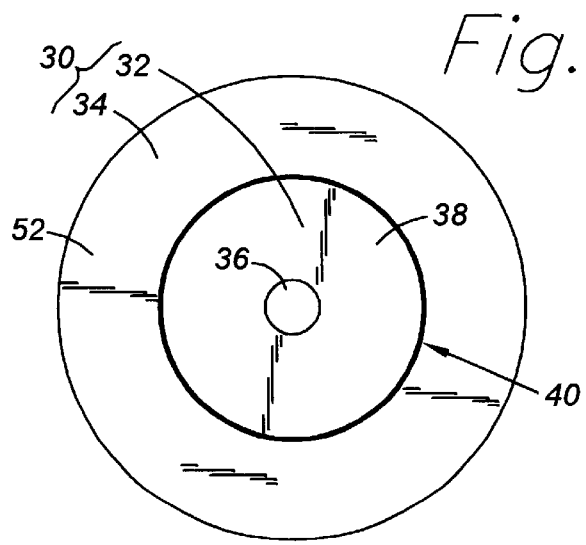
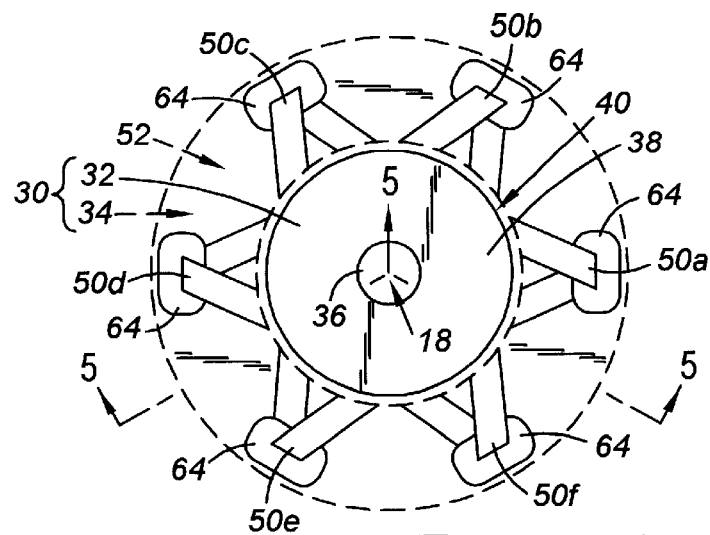
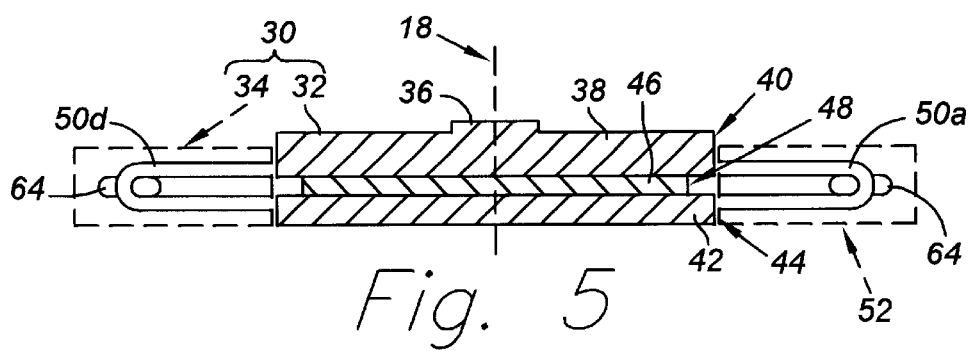

SPINDLE MOTOR INCLUDING STATOR WITH MAGNETIC FLUX GUIDES

BACKGROUND OF THE INVENTION

CROSS-REFERENCE TO RELATED APPLICATIONS

Not applicable.

1. Field of the Invention

The present invention relates generally to disk drives, and in particular to a spindle motor including a stator with magnetic flux guides.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms that extend from an opposite side of the actuator body. A head gimbal assembly includes at least one transducer head, sometimes two, which is distally attached to each of the actuator arms. The actuator assembly includes the actuator body that has a bore and a pivot bearing cartridge engaged within the bore. The head gimbal assembly and the flex circuit cable assembly are attached to the actuator assembly.

The spindle motor includes a spindle motor rotor or hub that is rotatably coupled to the disk drive base. The rotor has an outer flange that supports one of the disks. Additional disks may be stacked and separated with spacers. The spindle motor further includes an annular magnet element and a stator. The magnet element is typically attached about the lowermost portion of the rotor below the flange. The magnet element consists of a predetermined number of N and S poles that are disposed alternately circumferentially about the magnet element. The stator includes an outer stator rim that is attached to the disk drive base and a plurality of internally facing stator teeth. The stator teeth are equally spaced and extend from the stator rim. The stator is sized to fit about the rotor and in particular the magnet element. Each stator tooth includes windings that are oriented vertically about each of the stator teeth. The windings selectively conduct current to create a magnetic field that interacts with the various poles of the magnet element. Such interaction results in forces applied to the rotor that tend to rotate the rotor.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications.

One particular area of focus is the reduction of the height of the disk drive. It is contemplated that the spindle motor of a disk drive may become a limiting factor in the overall sizing of the disk drive height. The mere reduction in vertical sizing of the spindle motor components, such as the stator teeth, however, would directly reduce the flux density associated with the stator motor that may be below acceptable specifications. In addition, magnetic fields associated with adjacent stator teeth tend to negatively impact each other (i.e., magnetic leakage) due to their relatively close proximity. Accordingly, there is a need in the art for an improved spindle motor configuration in comparison to the prior art.

SUMMARY OF THE INVENTION

An aspect of the invention can be regarded as a spindle motor for use in a disk drive. The spindle motor includes a spindle motor rotor and a stator. The spindle motor rotor defines a central axis. The spindle motor rotor includes a first plate defining a circular first plate periphery disposed about the central axis, a second plate defining a circular second plate periphery disposed about the central axis, and a magnet defining a circular periphery disposed about the central axis between and parallel to the first and second plates. The stator includes a plurality of magnetic flux guides distributed radially about the spindle motor rotor. Each magnetic flux guide includes a U-shaped guide body, a first end extending from the guide body and terminating at a first tooth face disposed adjacent the first plate periphery, and a second end extending from the guide body opposite the first end and terminating at a second tooth face disposed adjacent the second plate periphery. The second end is angularly off-set about the central axis with respect to the first end. The stator may further include windings disposed about each of the U-shaped guide bodies. The windings may be horizontally disposed. In the manufacturing of the magnetic flux guides, the individual guides may be formed from a single piece of material. In an embodiment, each tooth face may include multiple tooth faces.

According to another aspect of the present invention, there is provided a spindle motor for use in a disk drive. The spindle motor includes a spindle motor rotor and a stator. The spindle motor rotor defines a central axis. The spindle motor rotor includes a first plate defining a circular first plate periphery disposed about the central axis, a second plate defining a circular second plate periphery disposed about the central axis, and a magnet defining a circular periphery disposed about the central axis between and parallel to the first and second plates. The stator includes a plurality of magnetic flux guides distributed radially about the spindle motor rotor. Each magnetic flux guide includes a U-shaped guide body, a first end extending from the guide body and terminating at a first tooth face disposed adjacent the first plate periphery, and a second end extending from the guide body opposite the first end and terminating at a second tooth face disposed adjacent the second plate periphery. The second end is radially off-set from the central axis with respect to the first end. The stator may further include windings disposed about each of the U-shaped guide bodies. The windings may be horizontally disposed. In the manufacturing of the magnetic flux guides, the individual guides may be formed from a single piece of material. In an embodiment, each tooth face may include multiple tooth faces. In addition, the second end of each of the magnetic guide bodies may be angularly off-set about the central axis with respect to the first end.

According to another aspect of the present invention, there is provided a spindle motor for use in a disk drive. The spindle motor includes a spindle motor rotor and a stator. The spindle motor rotor defines a central axis. The spindle motor rotor includes a first plate defining a circular first plate periphery disposed about the central axis, a second plate defining a circular second plate periphery disposed about the central axis, and a magnet defining a circular periphery disposed about the central axis between and parallel to the first and second plates. The stator includes a plurality of magnetic flux guides distributed radially about the spindle motor rotor. Each magnetic flux guide includes a U-shaped guide body, a first end extending from the guide body and terminating at a first tooth face disposed radially adjacent the first plate periphery, and a second end extending from the guide body opposite the first end, horizontally overlapping with the second plate and terminating at a second tooth face disposed adjacent the second plate periphery. The first end and the first plate define a vertical gap. The second end and the second plate define a horizontal gap. The stator may further include windings disposed about each of the U-shaped guide bodies. The windings may be horizontally disposed. In the manufacturing of the magnetic flux guides, the individual guides may be formed from a single piece of material. In an embodiment, each tooth face may include multiple tooth faces. In addition, the second end of each of the magnetic guide bodies may be angularly off-set about the central axis with respect to the first end. The second end of each of the magnetic guide bodies may be radially off-set with respect to the first end.

In addition, according to other aspects of the present invention, the above described spindle motors may be included in a disk drive. Each such disk drive includes a disk drive base with the rotor rotatably coupled to the disk drive base and the stator attached to the disk drive base.

BRIEF DESCRIPTION OF THE DRAWINGS

FIG. 3 is a top view of the spindle motor of FIG. 1;

FIG. 4 is the spindle motor of FIG. 3 with the stator including a housing (indicated in phantom) and a plurality of magnetic flux guides;

FIG. 5 is a cross sectional view of the spindle motor of FIG. 4 as seen along axes 5—5—5.

DESCRIPTION OF THE PREFERRED EMBODIMENTS

Figure 1:
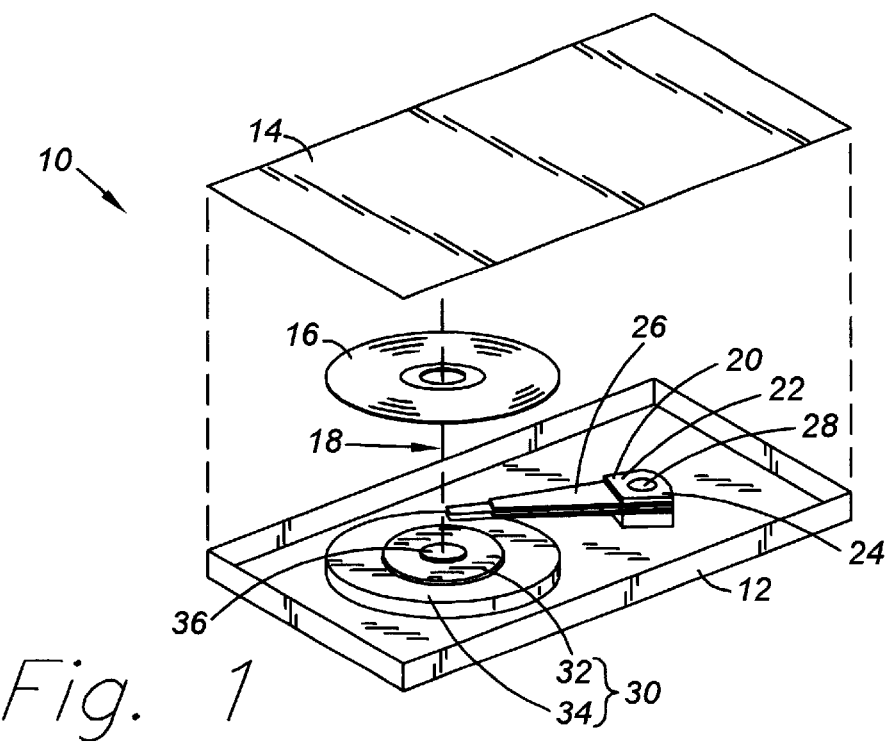
FIG. 1 is an exploded perspective view of a disk drive including a spindle motor as constructed in accordance with aspects of the present invention.

Referring now to the drawings wherein the showings are for purposes of illustrating preferred embodiments of the present invention only, and not for purposes of limiting the same, FIGS. 1–16 illustrate a disk drive in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16 configured to rotate about a central axis 18. The disk 16 contains a plurality of tracks for storing data. As will be discussed in detail below, the head disk assembly further includes a spindle motor 30 for rotating the disk 16.

In addition, the head disk assembly further includes a head stack assembly 20. The head stack assembly 20 includes a rotary actuator 22 that includes an actuator body 24. An actuator arm 26 extends from the actuator body 24, and a head is attached from a distal end of the actuator arm 26. The head stack assembly 20 further includes a pivot bearing cartridge 28 which is disposed within a bore of the actuator body 22. The pivot bearing cartridge 28 is attached to the disk drive base 12. The pivot bearing cartridge 28 facilitates rotation of the head stack assembly 20 so as to move the head relative to the disk 16 for reading and writing operations with respect to the tracks contained on the disk 16.

Figure 2:
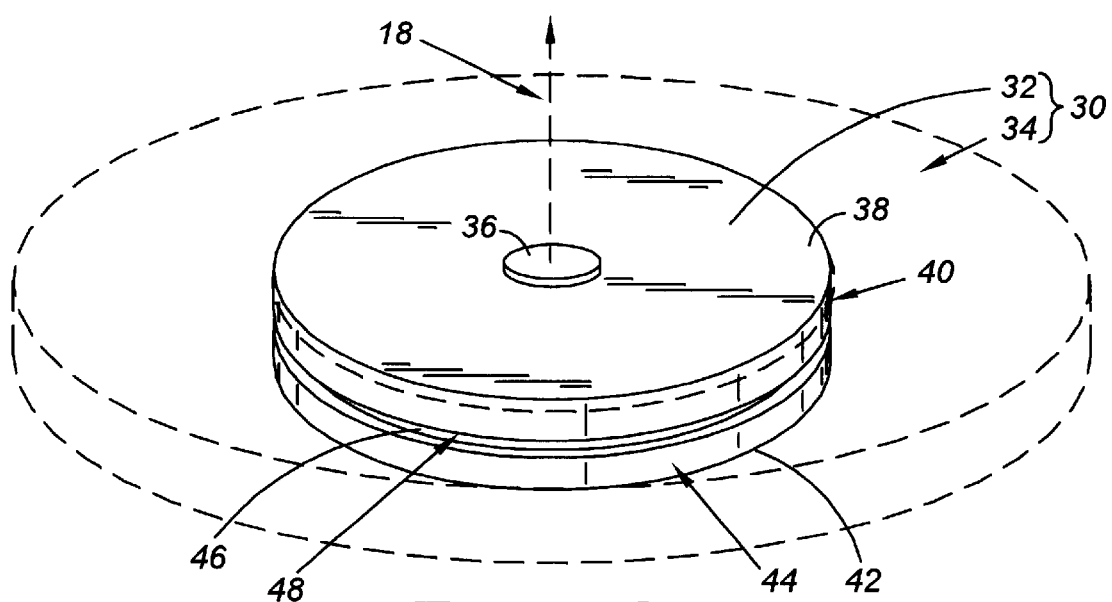
FIG. 2 is an enlarged perspective view of the spindle motor of FIG. 1 including a rotor and stator (indicated in phantom)

The disk drive 10 includes a spindle motor 30. Referring additionally to FIG. 2, the spindle motor 30 shown in perspective view includes a spindle motor rotor 32 and a stator 24 (indicated in phantom). Further, FIG. 3 is a top view of the spindle motor 30. The spindle motor rotor 32 defines the central axis 18. The spindle motor rotor 32 is rotatably coupled to the disk drive base 12. In this regard, various bearing arrangements may be utilized. For example, though not shown, jewel bearings may be disposed at the bottom side of the spindle motor rotor 32 and the disk drive base 12 and at the top side of the spindle motor rotor 32 and the cover 14. The spindle motor rotor 32 is configured to support the disk 16. In this regard, the spindle motor rotor 32 may include a hub 36 which is sized and configured to be received by the disk 16. Though not shown, a disk clamp may be used to attach the disk 16 to the spindle motor rotor 32. As will be discussed in further detail below, the magnetic interaction of the spindle motor rotor 32 and the stator 24 results forces applied to the spindle motor rotor 32 that tend to rotate the spindle motor rotor 32 and therefore the disk 16.

Referring now to FIGS. 1–3, an aspect of the invention can be regarded as the spindle motor 30 that includes the spindle motor rotor 32 and the stator 34. The spindle motor rotor 32 defines the central axis 18. The spindle motor rotor 32 includes a first plate 38 defining a circular first plate periphery 40 disposed about the central axis 18. The spindle motor rotor 32 includes a second plate 42 defining a circular second plate periphery 44 disposed about the central axis 18. The spindle motor rotor 32 includes a magnet 46 defining a circular periphery 48 disposed about the central axis 18 between and parallel to the first and second plates 38, 42.

Figure 6:
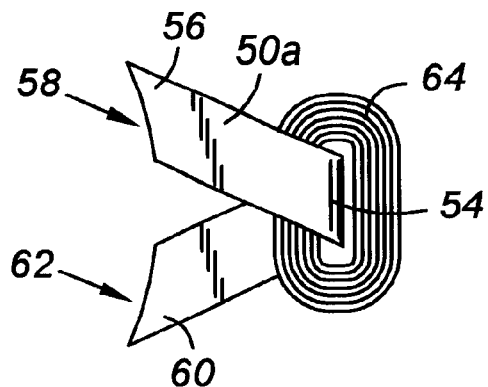
FIG. 6 is a top view of a magnetic flux guide of the spindle motor of FIG. 4.
Figure 7:
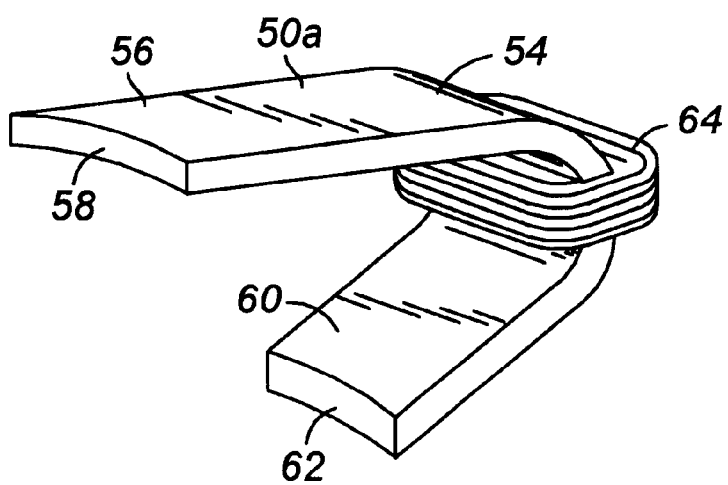
FIG. 7 is a perspective view of the magnetic flux guide of FIG. 6.

The stator 34 includes a plurality of magnetic flux guides 50 (individually denoted 50a–f in FIG. 4) distributed radially about the spindle motor rotor 32. FIG. 4 depicts the spindle motor 30 of FIG. 3 with the stator 34 including a housing 52 (indicated in phantom) and the magnetic flux is guides 50a–f FIG. 5 is a cross sectional view of the spindle motor 30 of FIG. 4 as seen along axes 5—5—5. FIG. 6 is a top view of magnetic flux guide 50a of the spindle motor 30 of FIG. 4. FIG. 7 is a perspective view of the magnetic flux guide 50a of FIG. 6. It is contemplated that a greater or lesser number of flux guides 50 may be utilized in the spindle motor 30 according to conventional motor design practices.

Each of the magnetic flux guides 50a–f includes a U-shaped guide body 54. Each of the magnetic flux guides 50a–f further include a first end 56 extending from the guide body 54 and terminating at a first tooth face 58 disposed adjacent the first plate periphery 40. Each of the magnetic flux guides 50a–f further include a second end 60 extending from the guide body 54 opposite the first end 56 and terminating at a second tooth face 62 disposed adjacent the second plate periphery 44. Each of the second ends 60 is angularly off-set about the central axis 18 with respect to the associated first end 56. In this regard, such angular off-set is best seen in the top views of FIGS. 4 and 6.

The stator 34 may further include windings 64 disposed about each of the U-shaped guide bodies 54. The windings 64 selectively conduct current to create a magnetic field that interacts with poles of the magnet 46. Such interaction results in forces applied to the spindle motor rotor 32 for effecting the rotation of the spindle motor rotor 32. The windings 64 may be horizontally disposed. Such disposition is contemplated to facilitate the low profile of the stator 34.

Figure 8:
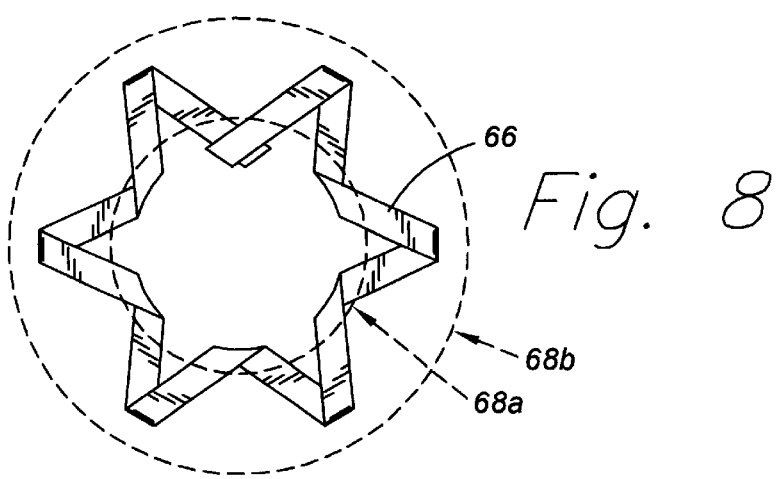
FIG. 8 is a top view of a metallic ribbon which is coiled and arranged in a circular pattern during a manufacturing process of a stator (with the completed stator outline indicated in phantom)
Figure 9:
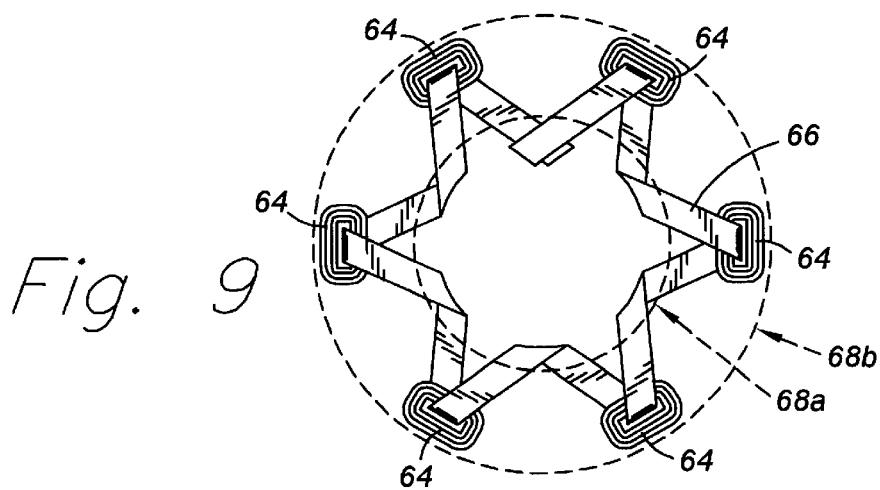
FIG. 9 is a top view of the metallic ribbon of FIG. 8 as shown with windings disposed about selective portions of the ribbon.
Figure 10:
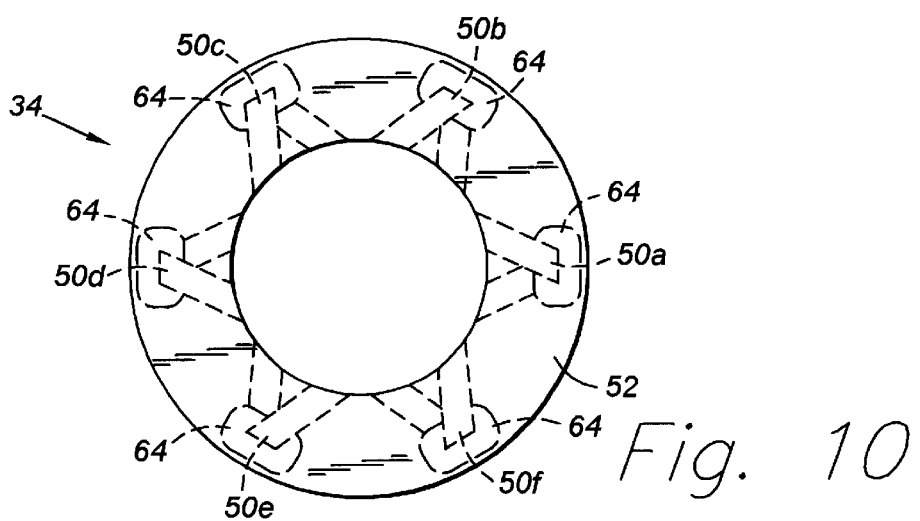
FIG. 10 is a top view of a stator including individual magnetic flux guides (as shown in phantom) as formed from cutting the metallic ribbon of FIG. 9.

Referring now to FIGS. 8–10, there is depicted the stator 30 in various stages of an exemplary fabrication process thereof In this regard, FIG. 8 depicts a top view of a metallic ribbon 66 which is coiled and arranged in a circular pattern. The ribbon 66 is shown in relation to a completed stator inner and outer outlines 68a,b as indicated in phantom. FIG. 9 is a top view of the metallic ribbon of FIG. 8 as shown with the windings 64 disposed about selective portions of the ribbon 66. The ribbon 66 may be partially encapsulated in a material, such as a plastic, which may form a portion of the housing 52 of the completed stator 34. Such encapsulation allows for the ribbon 66 to be fixed in such coiled, circular pattern during the process of applying the windings 64. The ribbon 66 may be bent in a squashing type of operation to limit the height of the ribbon to a desired thickness. Next, the ribbon 66 may be fully encapsulated. A cutting or removal process may be initiated which removes any portion of the encapsulation material and ribbon 66 which is interior of the completed stator inner outline 68a. FIG. 10 is a top view of the stator 34 with the housing 52 and the individual magnetic flux guides 50a–f (as shown in phantom) as formed from cutting the metallic ribbon 66 of FIG. 9. Thus, such a process allows the magnetic flux guides 50a–f to be formed from a single piece of material. This has an advantage of the material of each of the flux guides 50a–f having substantially identical mechanical and magnetic properties.

Figure 11:
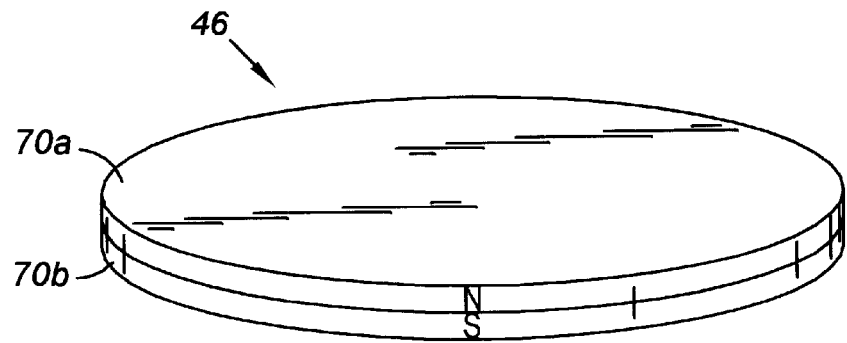
FIG. 11 is a perspective view of a magnet of the rotor of FIG. 2 with opposing poles on each face of the magnet.

Referring now to FIG. 11, there is depicted the magnet 46. In an embodiment, the magnet 46 includes opposing halves 70a,b with opposite poles of the magnet 46. Half 70a includes an indication of being a N type pole, and half 70b includes an indication of being a S type pole. The first plate 38 is configured to be in communication with the half 70a. The first and second plates 38, 42 are formed of a magnetic material, such as Nickel steel, Silicon steel or soft iron. As such, the first plate 38 becomes energized to have a relative N type polarity. Likewise, the second plate 42 is configured to be in communication with the half 70b. As such, the second plate 42 becomes energized to have a relative S type polarity. In this regard, the flux guides 50a–f are configured such that the first tooth faces 58 are disposed adjacent the first plate 38 having the N type polarity and the second tooth faces 62 are disposed adjacent the second plate 42 having the S type polarity. In this embodiment, as the first and second ends 56, 60 are angularly off-set about the central axis 18 with respect to each other, it is contemplated that magnetic leakage or interference between the interface at the first tooth faces 58 and the first plate 38 and at the second tooth faces 62 and the second plate 42.

Figure 12:
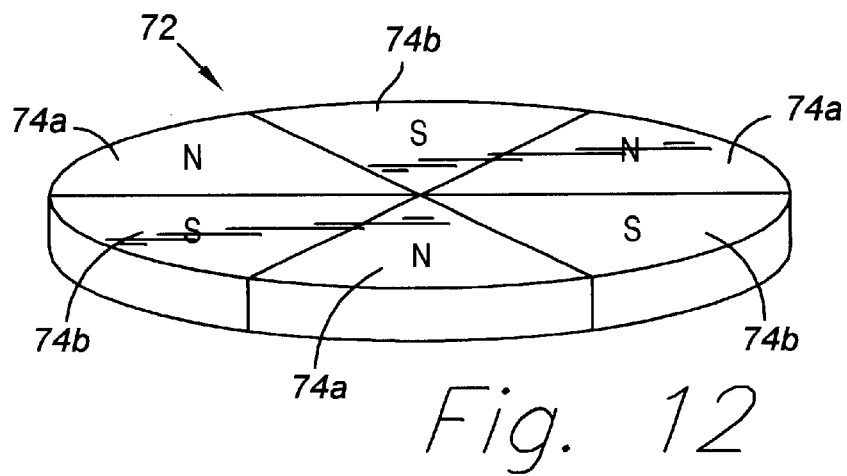
FIG. 12 is a perspective view of a magnet according to another embodiment with a plurality of poles associated with various angular sections.
Figure 13:
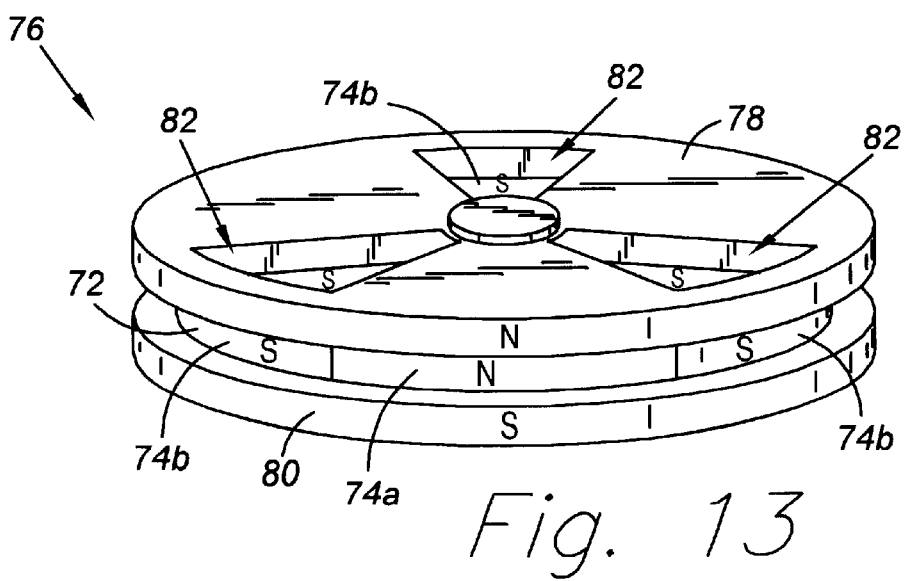
FIG. 13 is a perspective view of a rotor according to another embodiment with the magnet of FIG. 12.

Referring now to FIG. 12 according to another embodiment, there is depicted a magnet 72. The magnet 72 includes angular segments 74a intermixed with angular segments 74b. Angular segments 74a have an N type polarity, and angular segments 74b have an S type polarity. Referring now to FIG. 13 there is depicted a spindle motor rotor 76 according to another embodiment. In this regard, the spindle motor rotor 76 may be interchanged with the spindle motor rotor 32 described above. The spindle motor rotor 76 includes the magnet 72 disposed between first and second plates 78, 80. The first plate 78 includes cut-out portions 82 corresponding to the angular segments 74b. The first plate 78 is predominately in contact with the angular segments 74a which are of the N type polarity. As such, the first plate 78 becomes energized to have a relative N type polarity. Similarly, the second plate 80 includes cut-out portions (not shown) corresponding to the angular segments 74a. The second plate 80 is predominately in contact with the angular segments 74b which are of the S type polarity. As such, the second plate 80 becomes energized to have a relative S type polarity.

Figure 14:
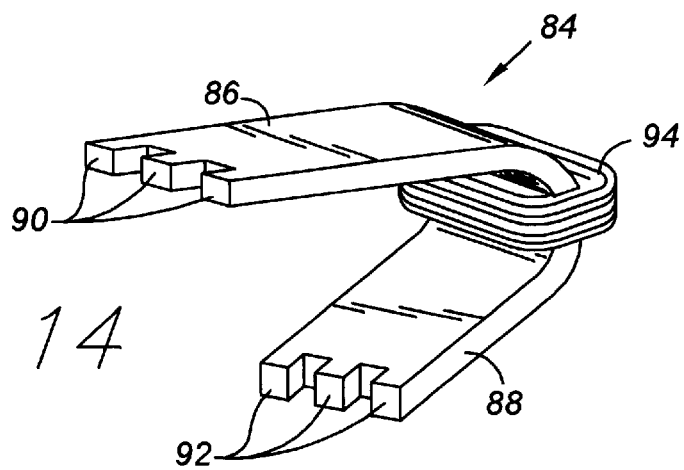
FIG. 14 is a perspective view of a magnetic flux guide including ends with multiple tooth faces according to another embodiment.

Referring now to FIG. 14, there is depicted a flux guide 84 similar in construction to the flux guides 50a–f, however with the differences noted. In this regard, the flux guide 84 may be substituted for use in the stator 34 for the flux guides 50a–f. The flux guide 84 includes first and second ends 86, 88. The first end 86 includes multiple tooth faces 90, and the second end 88 includes multiple tooth faces 92. It is contemplated that such an arrangement allows for such multiple tooth faces, 90, 92 all to be associated with a single set of windings 94.

Figure 15:
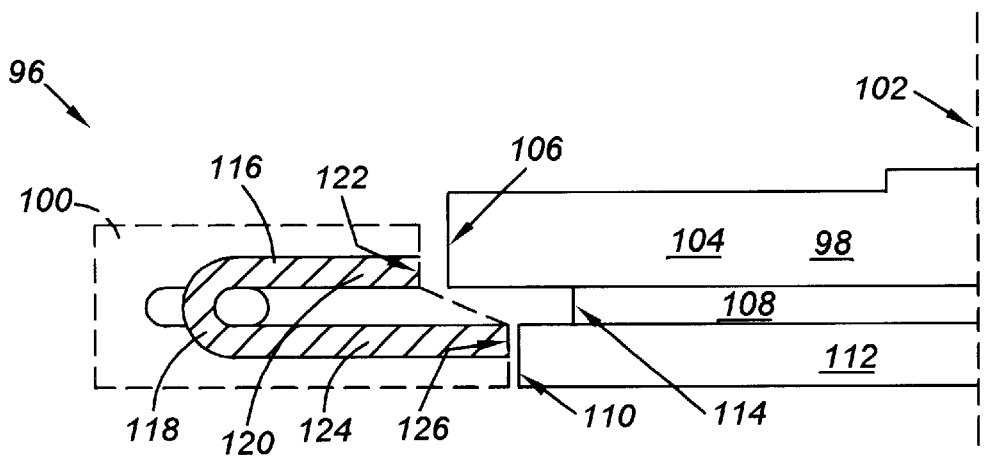
FIG. 15 is a cross-sectional view similar to the left half of the stator motor as shown in FIG. 5, however, with the ends of the magnetic flux guides being radially off-set according to another aspect of the present invention.

Referring now to FIG. 15, there is depicted a view of a portion of a spindle motor 96 similar to left half of the cross sectional view of the spindle motor 20 depicted in FIG. 5. The spindle motor 96 is similar in construction to the spindle motor 20, however, with the differences noted. According to another aspect of the present invention, there is provided the spindle motor 96 that includes a spindle motor rotor 98 and a stator 100. The spindle motor rotor 98 defines a central axis 102. The spindle motor rotor 98 includes a first plate 104 defining a circular first plate periphery 106 disposed about the central axis 102, a second plate 112 defining a circular second plate periphery 110 disposed about the central axis 106, and a magnet 108 defining a circular periphery 114 disposed about the central axis 102 between and parallel to the first and second plates 104,112. The stator 100 includes a plurality of magnetic flux guides 116 distributed radially about the spindle motor rotor 98. Each magnetic flux guide 116 includes a U-shaped guide body 118, a first end 120 extending from the guide body 118 and terminating at a first tooth face 122 disposed adjacent the first plate periphery 106, and a second end 124 extending from the guide body 118 opposite the first end 120 and terminating at a second tooth face 126 disposed adjacent the second plate periphery 110. The second end 124 is radially off-set from the central axis 102 with respect to the first end 120. In this regard, the first and second tooth faces 122,126 are at different radial distances from the central axis 102.

In the embodiment shown, the first tooth face 122 is disposed radially further from the central axis in comparison to the second tooth face 124. Preferably, the first and second plate peripheries 106,110 are similarly radially off-set with respect to the central axis 102 as shown. It is contemplated that such radially off-set nature tends to mitigate magnetic field interference of the magnetic fields respectively associated with the first and second tooth faces 122,126. In addition, the first and second ends 120,124 may be angularly off-set about the central axis 102 with respect to each other. It is contemplated that such angular off-set nature tends to further mitigate magnetic field interference of the magnetic fields respectively associated with the first and second tooth faces 122,126.

Figure 16:
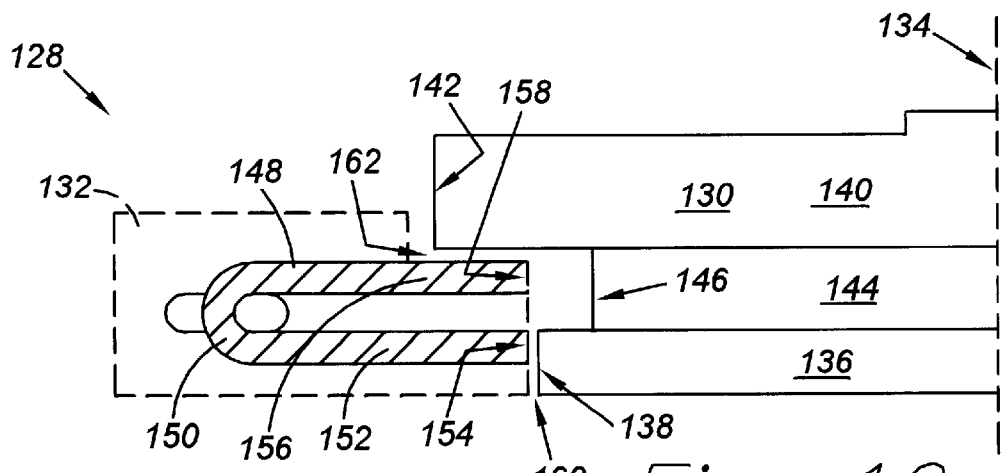
FIG. 16 is a cross-sectional view similar to the left half the stator motor shown in FIG. 5, however, with the ends of the flux guides forming vertical and horizontal gaps with respect to a rotor according to another aspect of the present invention.

Referring now to FIG. 16, there is depicted a view of a portion of a spindle motor 128 similar to left half of the cross sectional view of the spindle motor 20 depicted in FIG. 5. The spindle motor 128 is similar in construction to the spindle motor 20, however, with the differences noted. According to another aspect of the present invention, there is provided the spindle motor 128 that includes a spindle motor rotor 130 and a stator 132. The spindle motor rotor 130 defines a central axis 134. The spindle motor rotor 130 includes a first plate 136 defining a circular first plate periphery 138 disposed about the central axis 134, a second plate 140 defining a circular second plate periphery 142 disposed about the central axis 134, and a magnet 144 defining a circular periphery 146 disposed about the central axis 134 between and parallel to the first and second plates 136,140. The stator 132 includes a plurality of magnetic flux guides 148 distributed radially about the spindle motor rotor 130.

Each magnetic flux guide 148 includes a U-shaped guide body 150, a first end 152 extending from the guide body 150 and terminating at a first tooth face 154 disposed radially adjacent the first plate periphery 138, and a second end 156 extending from the guide body 150 opposite the first end 152, horizontally overlapping with the second plate 140 and terminating at a second tooth face 158 disposed adjacent the second plate periphery 142. In this regard, the second tooth face 158 is adjacent the second plate periphery 142 as defined by about the distance of the horizontal overlap. The first end 152 and the first plate 136 define a vertical gap 160. The second end 156 and the second plate 140 define a horizontal gap 162. It is contemplated that such different orientations tend to mitigate magnetic field interference of the magnetic fields respectively associated with the first and second tooth faces 154,158. In addition, the first and second ends 120,124 may be angularly off-set about the central axis 134 with respect to each other. It is contemplated that such angular off-set nature tends to further mitigate magnetic field interference of the magnetic fields respectively associated with the first and second tooth faces 154,158. Further, the first and second ends 120,124 may be radially off-set with respect to the central axis 134 with respect to each other. It is contemplated that such angular off-set nature tends to further mitigate magnetic field interference of the magnetic fields respectively associated with the first and second tooth faces 154,158.

I claim:

1. A spindle motor for use in a disk drive, the spindle motor comprising:
    a spindle motor rotor defining a central axis, the spindle motor rotor including:
        a first plate defining a circular first plate periphery disposed about the central axis;
        a second plate defining a circular second plate periphery disposed about the central axis; and
        a magnet defining a circular periphery disposed about the central axis between and parallel to the first and second plates; and
    a stator including:
        a plurality of magnetic flux guides distributed radially about the spindle motor rotor, each magnetic flux guide including:
            a U-shaped guide body;
            a first end extending from the guide body and terminating at a first tooth face disposed adjacent the first plate periphery; and
            a second end extending from the guide body opposite the first end and terminating at a second tooth face disposed adjacent the second plate periphery, the second end being angularly off-set about the central axis with respect to the first end.

2. The spindle motor of claim 1 wherein the stator further includes windings disposed about each of the U-shaped guide bodies.

3. The spindle motor of claim 2 wherein the windings are horizontally disposed.

4. The spindle motor of claim 1 wherein the magnetic flux guides are formed from a single piece of material.

5. The spindle motor of claim 1 wherein each tooth face includes multiple tooth faces.

6. A disk drive comprising:
    a disk drive base: and
    a spindle motor including:
        a spindle motor rotor rotatably coupled to the disk drive base, the spindle motor rotor defining a central axis, the spindle motor rotor including:
            a first plate defining a circular first plate periphery disposed about the central axis;
            a second plate defining a circular second plate periphery disposed about the central axis; and
            a magnet defining a circular periphery disposed about the central axis between and parallel to the first and second plates; and
    a stator attached to the disk drive base, the stator including:
        a plurality of magnetic flux guides distributed radially about the spindle motor rotor, each magnetic flux guide including:

a U-shaped guide body;
a first end extending from the guide body and terminating at a first tooth face disposed adjacent the first plate periphery; and
a second end extending from the guide body opposite the first end and terminating at a second tooth face disposed adjacent the second plate periphery, the second end being angularly off-set about the central axis with respect to the first end.

7. A spindle motor for use in a disk drive, the spindle motor comprising:
a spindle motor rotor defining a central axis, the spindle motor rotor including:
a first plate defining a circular first plate periphery disposed about the central axis;
a second plate defining a circular second plate periphery disposed about the central axis; and
a magnet defining a circular periphery disposed about the central axis between and parallel to the first and second plates; and
a stator including:
a plurality of magnetic flux guides distributed radially about the spindle motor rotor, each magnetic flux guide including:
a U-shaped guide body;
a first end extending from the guide body and terminating at a first tooth face disposed adjacent the first plate periphery; and
a second end extending from the guide body opposite the first end and terminating at a second tooth face disposed adjacent the second plate periphery, the second end being radially off-set from the central axis with respect to the first end.

8. The spindle motor of claim 7 wherein the stator further includes windings disposed about each of the U-shaped guide bodies.

9. The spindle motor of claim 8 wherein the windings are horizontally disposed.

10. The spindle motor of claim 7 wherein the magnetic flux guides are formed from a single piece of material.

11. The spindle motor of claim 7 wherein each tooth face includes multiple tooth faces.

12. The spindle motor of claim 7 wherein the second end of each of the magnetic guide bodies is angularly off-set about the central axis with respect to the first end.

13. A disk drive comprising:
a disk drive base; and
a spindle motor including:
a spindle motor rotor rotatably coupled to the disk drive base, the spindle motor rotor defining a central axis, the spindle motor rotor including:
a first plate defining a circular first plate periphery disposed about the central axis;
a second plate defining a circular second plate periphery disposed about the central axis; and
a magnet defining a circular periphery disposed about the central axis between and parallel to the first and second plates; and
a stator attached to the disk drive base, the stator including:
a plurality of magnetic flux guides distributed radially about the spindle motor rotor, each magnetic flux guide including:
a U-shaped guide body;
a first end extending from the guide body and terminating at a first tooth face disposed adjacent the first plate periphery; and
a second end extending from the guide body opposite the first end and terminating at a second tooth face disposed adjacent the second plate periphery, the second end being radially off-set from the central axis with respect to the first end.

14. A spindle motor for use in a disk drive, the spindle motor comprising:
a spindle motor rotor defining a central axis, the spindle motor rotor including:
a first plate defining a circular first plate periphery disposed about the central axis;
a second plate defining a circular second plate periphery disposed about the central axis; and
a magnet defining a circular periphery disposed about the central axis between and parallel to the first and second plates; and
a stator including:
a plurality of magnetic flux guides distributed radially about the spindle motor rotor, each magnetic flux guide including:
a U-shaped guide body;
a first end extending from the guide body and terminating at a first tooth face disposed radially adjacent the first plate periphery, the first end and the first plate defining a vertical gap; and
a second end extending from the guide body opposite the first end, horizontally overlapping with the second plate and terminating at a second tooth face disposed adjacent the second plate periphery, the second end and the second plate defining a horizontal gap.

15. The spindle motor of claim 14 wherein the stator further includes windings disposed about each of the U-shaped guide bodies.

16. The spindle motor of claim 15 wherein the windings are horizontally disposed.

17. The spindle motor of claim 14 wherein the magnetic flux guides are formed from a single piece of material.

18. The spindle motor of claim 14 wherein each tooth face includes multiple tooth faces.

19. The spindle motor of claim 14 wherein the second end of each of the magnetic guide bodies is angularly off-set about the central axis with respect to the first end.

20. The spindle motor of claim 14 wherein the second end of each of the magnetic guide bodies is radially off-set with respect to the first end.

21. A disk drive comprising:
a disk drive base; and
a spindle motor including:
a spindle motor rotor rotatably coupled to the disk drive base, the spindle motor rotor defining a central axis, the spindle motor rotor including:
a first plate defining a circular first plate periphery disposed about the central axis;
a second plate defining a circular second plate periphery disposed about the central axis; and
a magnet defining a circular periphery disposed about the central axis between and parallel to the first and second plates; and
a stator attached to the disk drive base including:
a plurality of magnetic flux guides distributed radially about the spindle motor rotor, each magnetic flux guide including:
a U-shaped guide body;
a first end extending from the guide body and terminating at a first tooth face disposed radially adjacent the first plate periphery, the first end and the first plate defining a vertical gap; and a second end extending from the guide body opposite the first end, horizontally overlapping with the second plate and terminating at a second tooth face disposed adjacent the second plate periphery, the second end and the second plate defining a horizontal gap.

* * * * *